US007409062B2

(12) United States Patent
Meyer et al.

(10) Patent No.: US 7,409,062 B2
(45) Date of Patent: Aug. 5, 2008

(54) METHOD AND DEVICE FOR THE GENERATION OF CHECKABLE FORGERY-PROOF DOCUMENTS

(75) Inventors: Bernd Meyer, Königswinter (DE); Jürgen Lang, Bergisch Gladbach (DE)

(73) Assignee: Deutsche Post AG, Bonn (DE)

( * ) Notice: Subject to any disclaimer, the term of this patent is extended or adjusted under 35 U.S.C. 154(b) by 197 days.

(21) Appl. No.: 10/506,908

(22) PCT Filed: Mar. 10, 2003

(86) PCT No.: PCT/DE03/00760

§ 371 (c)(1),
(2), (4) Date: May 16, 2005

(87) PCT Pub. No.: WO03/079609

PCT Pub. Date: Sep. 25, 2003

(65) Prior Publication Data

US 2005/0226422 A1 Oct. 13, 2005

(30) Foreign Application Priority Data

Mar. 13, 2002 (DE) ................................ 102 11 265

(51) Int. Cl.
*H04L 9/20* (2006.01)
*H04K 1/00* (2006.01)

(52) U.S. Cl. ........................... 380/277; 380/46; 705/60; 705/61; 705/62

(58) Field of Classification Search ....................... None
See application file for complete search history.

(56) References Cited

U.S. PATENT DOCUMENTS 5,142,577 A 8/1992 Pastor ......................... 380/21
5,606,609 A * 2/1997 Houser et al. ............... 713/179
5,812,666 A * 9/1998 Baker et al. ................. 380/277

(Continued)

FOREIGN PATENT DOCUMENTS

CA 2425184 4/2003

(Continued)

OTHER PUBLICATIONS

International Search Report in PCT/DE03/00760 dated Aug. 19, 2003.

*Primary Examiner*—Ayaz Sheikh
*Assistant Examiner*—Trang Doan
(74) *Attorney, Agent, or Firm*—Marshall, Gerstein & Borun LLP

(57) ABSTRACT

The invention relates to a method and a device for the generation of checkable forgery-proof documents with an externally supplied cryptographic module, whereby the checking of authenticity of the document is carried out without using key information belonging to the cryptographic module. According to the invention, the method and the device are characterised in that the cryptographic module is supplied with two types of data, even on supply from a communication partner which is cryptographically not trustworthy, which either remain in the cryptographic module or are attached to the document. The information remaining in the cryptographic module is used to secure the document information by means of a check value and the information transferred into the document serves to verify the securing of the document by the cryptographic module during a check of the authenticity of the document at a checkpoint.

19 Claims, 3 Drawing Sheets

U.S. PATENT DOCUMENTS

| | | | | | |
|---|---|---|---|---|---|
| 5,872,848 | A * | 2/1999 | Romney et al. | 713/176 |
| 5,982,506 | A * | 11/1999 | Kara | 358/405 |
| 5,987,140 | A * | 11/1999 | Rowney et al. | 705/79 |
| 6,023,296 | A * | 2/2000 | Lee et al. | 375/240.05 |
| 6,401,206 | B1 * | 6/2002 | Khan et al. | 713/176 |
| 6,724,894 | B1 * | 4/2004 | Singer | 380/28 |
| 2002/0129238 | A1 * | 9/2002 | Toh et al. | 713/153 |
| 2004/0028233 | A1 | 2/2004 | Meyer et al. | 380/277 |
| 2004/0039714 | A1 | 2/2004 | Meyer et al. | 705/408 |

FOREIGN PATENT DOCUMENTS

| | | | |
|---|---|---|---|
| DE | 100 20 563 | C2 | 4/2001 |
| DE | 100 20 402 | A1 | 10/2001 |
| DE | 100 20 566 | A1 | 10/2001 |
| JP | H-11-175607 | A | 7/1997 |
| JP | H-10-269290 | A | 10/1998 |
| WO | WO 00/55817 | | 9/2000 |

* cited by examiner

METHOD AND DEVICE FOR THE GENERATION OF CHECKABLE FORGERY-PROOF DOCUMENTS

This is the U.S. national phase of International application No. PCT/DE03/00760 filed Mar. 10, 2003, the entire disclosure of which is incorporated herein by reference.

BACKGROUND OF THE INVENTION

The invention relates to a method for the generation of forgery-proof documents or data records, whereby key information is generated and encrypted checking information is formed from the key information and from a transaction indicator.

The invention also relates to a value transfer center and to a cryptographic module.

Numerous methods are known for generating forgery-proof documents and for checking them. Familiar methods are based on the generation of digital signatures or encrypted checking information, which are produced within the scope of the generation of the document.

A distinction has to be made between documents for which the writer has an interest in their genuineness and those for which third parties have an interest in their genuineness.

If a third party has an interest in documents being forgery-proof, then it is a known procedure to use a so-called "cryptographic module" for generating the document. Such known cryptographic modules are characterized in that they contain electronic data within them or that they process data that cannot be accessed or manipulated from the outside.

A cryptographic module can be regarded as a secure, sealed unit in which security-relevant processes are carried out that cannot be manipulated from the outside. A worldwide recognized standard for such cryptographic modules is the standard for cryptographic modules published under the designation FIPS Pub 140 by the United States National Institute of Standards and Technology—NIST.

If a cryptographic module is used to generate forgery-proof documents for which third parties have an interest in their genuineness, then a customary implementation is that the cryptographic module is used to securely deposit cryptographic keys that serve within the module, and only there, to encrypt check values. For example, so-called signature cards of the type issued by certification agencies or trust centers for generating digital signatures are a familiar approach. These signature cards, in the form of microprocessor chip cards, also contain a cryptographic module precisely in this microprocessor chip.

As a rule, one or more asymmetrical key pairs are deposited in such modules which are characterized in that encryptions that have been generated with the so-called private key can only be reversed with the associated public key, and in that encryptions that have been generated with the public key can only be reversed with the associated private key. As their name indicates, public keys are intended for public disclosure and widespread dissemination, whereas private keys may not be handed out and, when used together with cryptographic modules, they must not leave these modules at any point in time. Also deposited in such modules are algorithms, for example, for forming checksums or, in the example of the digital signature, for generating a so-called digital fingerprint or "hash value" which is characterized in that it maps any desired data contents onto generally quantitatively considerably abbreviated information in such a way that the result is irreversible and unambiguous and in that, for different data contents with which the algorithm is supplied, different results are obtained in each case.

The generation of a forgery-proof document in whose genuineness third parties have an interest, which is done by means of a cryptographic module containing asymmetrical keys and an algorithm to form check values, is generally carried out in the following manner: first of all, using the algorithm to form check values, a check value is formed that relates to the document that is to be secured. Then a private key in the cryptographic module is used to encrypt the check value. The combination of these two processes is referred to as the generation of a "digital signature."

The checking of such a digital signature is normally carried out as follows: the recipient receives the document and the encrypted check value. The recipient also needs—and this is the objective of the invention described below—the public key of the document producer and the recipient uses this public key to decrypt the check value that the document producer has encrypted within the cryptographic module with his private key. Therefore, after the decryption, the recipient has the unencrypted check value. Moreover, in the next step, the recipient applies the same algorithm in order to form a check value for the received document. Finally, in the third step, the recipient compares the check value he himself has generated to the decrypted check value of the document producer. If both check values match, then the document was not forged and the genuineness of the document is substantiated beyond a doubt. Normally, in the case of known digital signatures, the authenticity of the document producer is checked. This is done in that the public key of the document producer is likewise digitally signed by a so-called certification agency or "CA" and it is allocated to a certain cryptographic module, or to a certain owner of the cryptographic module. In this case, the recipient of the document does not simply accept the public key of the document producer as a given but rather he likewise ascertains whether it belongs to the document producer by checking the digital signature of the public key in the manner described above.

With this known method, the problem exists that, in order to check the genuineness of a document, it is necessary to have information that is directly related to the document producer's use of keys by means of the cryptographic module. In the typical example described above for generating digital signatures, this is the public key of the document producer or of his cryptographic module, which has to be used for the checking procedure. In the case of the signature of the public key by a certification agency, the entire set comprising the public key, the identification of the user of this key and the digital signature of the certification agency is designated as the "key certificate."

To sum it up, this problem can be illustrated with reference to an example as follows: in order to check the genuineness of a normally digitally signed document, the public key or the key certificate of the document producer or of his cryptographic module has to be available during the checking procedure. If, as is customary, documents of different document producers are to be checked in a checking station, then it is necessary for all of the public keys or all of the key certificates of all document producers to be available there.

There are various ways to meet the requirement that the public key of the document producer has to be available during the checking procedure. Thus, it is possible to attach the public key or the key certificate of the document producer to the document that is to be secured. Another possibility is to deposit the public key at the checking station and to access it as the need arises.

The known methods, however, are associated with drawbacks.

Attaching the key or the key certificate is disadvantageous if the size of the document has to be kept as small as possible and if an attached key would excessively enlarge the data record that is to be printed, transmitted or processed.

Depositing a public key at the checking station is especially disadvantageous if access to keys deposited at the checking station is not possible for practical or time reasons, for example, in case of a very large number of stored keys which would have to be accessed within a very short period of time.

In order to overcome these known disadvantages, with a method of this generic type, it is disclosed in German patent specification DE 100 20 563 C2 to generate a secret in a security module, to transfer the secret together with information that reveals the identity of the security module in encrypted form to a certification agency, to decrypt the secret in the certification agency, thus recognizing the identity of the security module, to subsequently encrypt the secret together with information on the identity of the document producer in such a way that only a checking station can carry out a decryption, in order to then transmit the secret to a document producer. With this method, the document producer enters his own data into the security module, whereby the data entered by the document producer himself is irreversibly linked to the secret by means of the security module and whereby the secret cannot be reconstructed.

This known method is characterized in that the document that is transmitted to a checking station is formed from the result of the irreversible linking of the secret to the data entered by the document producer, from the data entered by the document producer himself and from the encrypted information of the certification agency.

This known method is especially suitable for generating and checking forgery-proof postage stamps of a postal service provider. Such postage stamps are generated by customers of a postal service provider using a personal cryptographic module and they are applied onto the mail piece as a machine-readable barcode. The machine-readable barcode has only a very limited data scope and consequently, it does not allow the entry of the public key of the customer. Moreover, during the so-called letter production, the digital postage stamps have to be read and checked within a very short period of time, as a result of which the possibility of accessing a database containing perhaps many millions of public keys is likewise not an option.

A method for providing mail pieces with postage indicia is known from German Preliminary Published Application DE 100 20 402 A1. With this method, information that serves to generate a postage indicia is transmitted in encrypted form from a loading station to a crypto-module of a customer system and then serves to generate digital postage indicia. The postage indicia contains a hash value that is formed from the mailing data and from the information that was transmitted and stored temporarily in the crypto-module and also contains a "Crypto-String" encrypted in this information that can only be decrypted in a mail center during the checking of the postage indicia, after which it is provided with a digital signature.

German Preliminary Published Application DE 100 20 566 A1 describes a method of the same type in which customers can load value amounts from a value transfer center and said value amounts can be consumed in order to print out digital postage indicia. Here, in particular, a customer system transmits a random number to the value transfer center and the latter encrypts the random number with a symmetrical key and sends it back to the customer system.

The postage indicia are generated in the same manner as described in German Preliminary Published Application DE 100 20 402, whereby in particular, the encrypted random number can only be decrypted in a mail center.

The invention is based on the objective of allowing the generation of forgery-proof documents in such a way that it can be carried out, independent of direct communication between the cryptographically reliable contact station and the document producer.

GENERAL DESCRIPTION

According to the invention, this objective is achieved by a method for the generation of forgery-proof documents or data records, whereby key information is generated and whereby encrypted checking information is formed from the key information and from a transaction indicator, including the steps of generating random key information and forming encrypted checking information from the key information and from a transaction indicator in a cryptographically reliable contact station, encrypting the key information in the cryptographically reliable contact station, transmitting the encrypted checking information and the encrypted key information by the cryptographically reliable contact station to an intermediate station, the intermediate station temporarily storing the encrypted key information and the encrypted checking information and subsequently transmitting this to a cryptographic module of a document producer at a different point in time from the transfer between the cryptographically reliable contact station and the intermediate station.

According to the invention, this objective is likewise achieved by a value transfer center with an interface for loading monetary values, including an interface to receive encrypted information of a cryptographically reliable contact station and to temporarily store the received encrypted information as well as means for receiving value transfer requests by at least one cryptographic module and of forwarding the received encrypted information to the cryptographic module at a different point in time.

The invention especially provides that the generation of the random key information and the formation of the encrypted checking information from the key information and from the transaction indicator are carried out in a cryptographically reliable contact station, in that the cryptographically reliable contact station encrypts the key information, and in that the encrypted checking information and the encrypted key information are transmitted by the cryptographically reliable contact station to an intermediate station, in that the intermediate station temporarily stores the encrypted key information and the encrypted checking information and transmits it to a cryptographic module of a document producer later on, at a different point in time from the transfer between the cryptographically reliable contact station and the intermediate station.

Therefore, the invention provides that the cryptographic module, also if it is supplied via an intermediate station, for example, via communication partners that are not reliable in the cryptographic sense—is provided with two types of data, one of which remains in the cryptographic module while the other is attached to the document, whereby the information remaining in the cryptographic module is used to secure the document information by means of a check value and whereby the information incorporated into the document, within the scope of a check of the genuineness of the document in a checking station, serves to substantiate that the document has been secured by means of the cryptographic module.

The disclosed method and value transfer center have numerous advantages. They make it possible to generate forgery-proof documents in a large number of application cases, especially in those cases where no direct connection exists between the document producer and the reliable contact station. For example, in this manner, forgery-proof documents can be generated without the use of computers and/or a data connection to the reliable contact station.

As a matter of principle, it is possible to select the key information according to a prescribed pattern. However, this facilitates cryptographic decrypting attacks (enigma problem).

It is especially advantageous for the key information to be formed by being generated randomly although the invention can be carried out with a predefinable set of key information. The random generation of the key information is especially advantageous since this makes it possible to avoid having to store large volumes of key information.

It has proven to be advantageous for the encrypted key information and/or the encrypted checking information to be configured in such a way that it cannot be decrypted in the intermediate station.

A decryption of the key information by the cryptographic module entails several advantages. In this way, a user of the cryptographic module, especially a document producer, can obtain a confirmation of having received information from the reliable contact station, especially monetary value information created by the reliable contact station. Moreover, in this fashion, the cryptographic module can use the received key information for a subsequent encryption.

A preferred use of the key information is for the encryption of the document producer's own data.

Advantageously, the document producer supplies his own data to the cryptographic module, preferably by an automated method.

An especially preferred embodiment of the invention is characterized in that the data entered by the document producer are irreversibly linked to the key information by means of the cryptographic module.

Here, it is especially advantageous for the data entered by the document producer and the decrypted key information to be irreversibly linked in that the key information is used to form a check value for the document.

Moreover, it is especially advantageous for the result of the irreversible linking of the data entered by the document producer with the decrypted key information to form a document and/or a data record that is transmitted to a checking station.

It has also proven to be advantageous for the document transmitted to the checking station to contain the document producer's own data at least partially in plain text.

For this purpose, it is especially advantageous for the encrypted checking information to be entered into the document that is transmitted to the checking station.

It is advantageous for the information remaining in the cryptographic module to be encrypted in such a way that it can be decrypted in the cryptographic module and for the information remaining in the cryptographic module to be a value that is difficult or impossible to predict.

It is especially advantageous for the supply of the cryptographic module via communication partners that are cryptographically not reliable to be carried out in such a way that an exchange of information within a dialog is not necessary.

It is likewise a special advantage that the supply of the cryptographic module via communication partners that are cryptographically non-reliable is carried out in such a way that the information is forwarded to the cryptographic module at a different point in time.

It has proven to be important and advantageous for the supply of the cryptographic module, also in case of a supply via communication partners that are cryptographically not reliable, to be carried out by a reliable station whose information can be relied on by the checking station.

Here, in order for a reliable station to provide reliable information for the cryptographic module, it is advantageous to use cryptographic encryptions that the checking station can reverse.

An advantageous refinement of the method provides for it to be carried out in such a way that the two types of data are cryptographically linked to each other, but cannot be discovered by means of crypto-analysis.

For this purpose, it has proven to be an advantage that the cryptographic linking of the two types of data is such that non-linear fractions are added that are known only to the reliable contact station and to the checking station.

Advantageously, the method is carried out in such a way that the generated forgery-proof documents or data records contain monetary value information.

It is advantageous for the monetary value information to be cryptographically connected to the document or data record in such a way that a check value can be formed by comparing the monetary value information to the document or data record.

Furthermore, it is advantageous for the monetary value information to contain proof of the payment of postage amounts.

Another advantage is for the monetary value information that proves the payment of postage amounts to be linked to identification data of the document producer.

Moreover, it is useful for the proof of the payment of a postage amount to be linked to address data.

A very important area of application for the invention is the generation of postage indicia. In this essential application case, various intermediate stations can be used. For example, a value transfer center of a franking machine manufacturer can be used as the intermediate station.

Another subject matter of the invention is a value transfer center with an interface for loading monetary values. In the applicable refinement of the invention, the value transfer center advantageously functions as an interface to receive encrypted information of a cryptographically reliable contact station and to temporarily store the received encrypted information.

It is advantageous for the information to be encrypted in such a way that it cannot be decrypted in the value transfer center.

Furthermore, it is advantageous for it to contain means for receiving value transfer requests by at least one cryptographic module and for forwarding the received encrypted information at a different point in time.

It is especially advantageous to have a cryptographic module for generating forgery-proof documents with means to issue encrypted checking information and a check value.

An advantageous embodiment provides that the cryptographic module contains at least one means for receiving and decrypting key information and at least one means for receiving a document or a data record, and that the cryptographic module has at least one means to form a check value for the document or for the data record.

BRIEF DESCRIPTION OF THE DRAWINGS

Additional advantages, special features and practical refinements of the invention ensue from the appended claims and from the description below of preferred embodiments making reference to the drawings.

The drawings show the following.

DETAILED DESCRIPTION

In order to achieve this objective, German patent specification DE 100 20 563 C2 discloses a method for generating forgery-proof documents in which there is no need to use information from the cryptographic module of the document producer in order to carry out the checking procedure. Instead, this method is based on the fact that a random number is formed in the cryptographic module of the customer. The precise method with its three involved parties (1. document producer with cryptographic module, 2. checking station and 3. reliable contact station) is shown in the accompanying FIG. 1. The numbers given in the text below relate to the steps of the method shown in FIG. 1.

Figure 1:
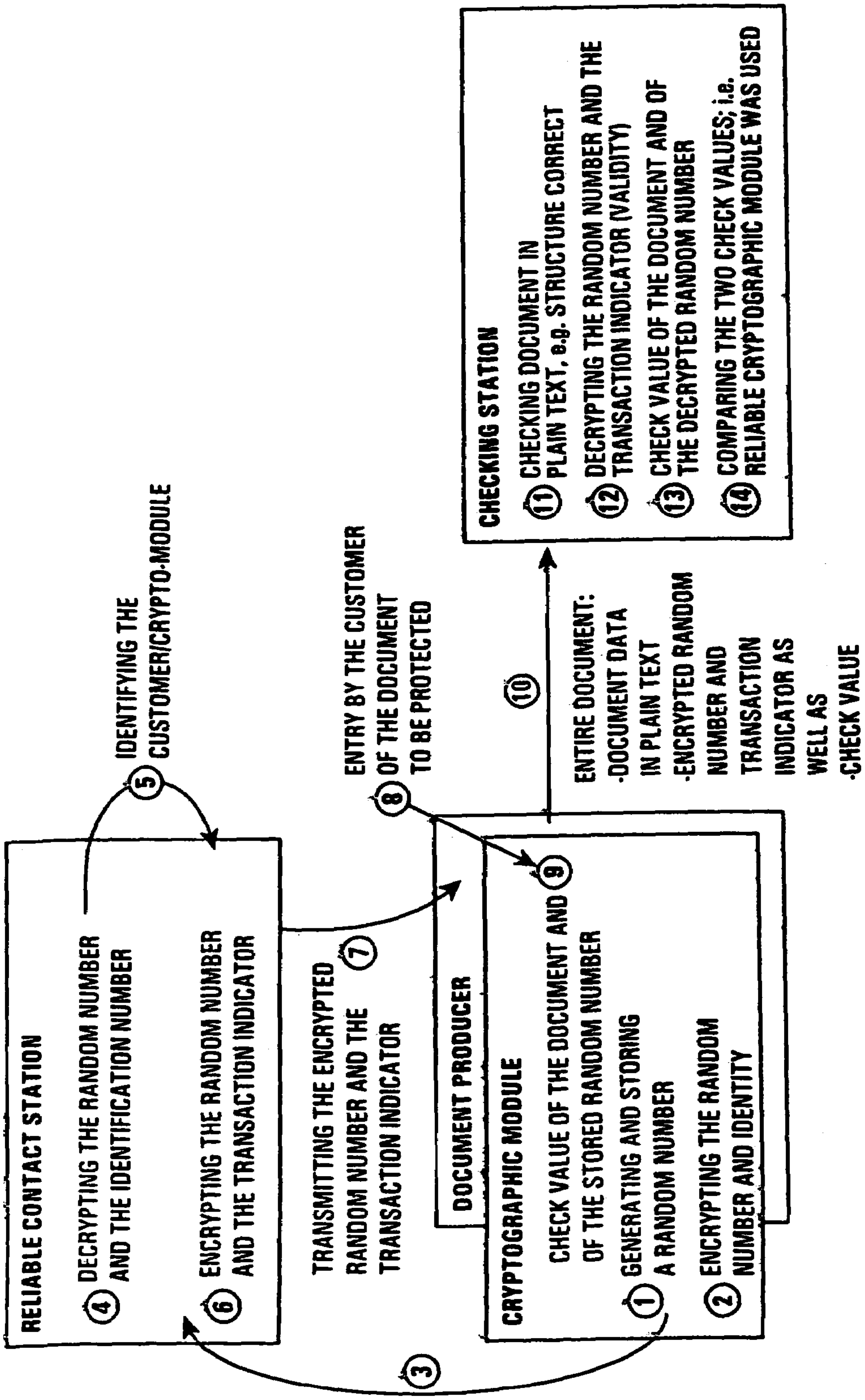
FIG. 1 the basic principle of a known cryptographic method.

In FIG. 1, in the cryptographic module of the document producer, a random number is generated and stored (1) which is transmitted, together with the identity or identification number of the document producer or of the cryptographic module to a reliable station (3) in encrypted form (2). This reliable station decrypts the random number and the identification number (4), checks the legitimacy of the request (5) and then encrypts the random number and a newly formed transaction indicator in such a way that only the checking station is capable of reversing this encryption (6). The random number encrypted in this manner and the transaction indicator are sent back to the document producer (7). When the forgery-proof documents are generated later on, the document producer then enters the document to be secured into the cryptographic module (8). There, using the document plain text and the random number that is still stored, a check value is formed (9). Now, the document in plain text, the encrypted random number transmitted by the reliable station and the encrypted transaction indicator as well as the checking information generated in the cryptographic module are transmitted to the checking station (10). In the checking station, after a rough check of the document structure (11), the genuineness is ascertained by decrypting the random number and the transaction indicator that had been encrypted in the reliable contact station (12). Subsequently, like in the cryptographic module of the document producer, using the document plain text and the random number that has just been decrypted, a check value is formed (13). This check value is finally compared to the check value transmitted by the document producer (14). If they match, then it is ensured that the document has been generated using a specific cryptographic module since the requisite random number is only present there and this module has exchanged information with the reliable contact station in a cryptographically secure manner. Since, on the one hand, a specific cryptographic module was used and, on the other hand, the check value matches, the identity of the document producer as well as the genuineness of the document are ensured.

The described method is used in a modified form by the Deutsche Post for the production of Internet postage stamps under the designation "PC franking." In summary, it is characterized in that the genuineness of the documents can be checked without the use of key information that is inherent to the cryptographic module. Instead, the checking station relies in part on information from a reliable contact station.

According to the invention, a method is created for the generation of digital documents and data records that can be carried out without direct contact between a cryptographically reliable contact station and the cryptographic module, or a document producer using the cryptographic module.

Although the generation of the documents and data records is by no means limited to the generation of postage indicia, or rather to mail pieces provided with postage indicia, the use of the described method and device features in a method for generating digital postage indicia is an especially preferred embodiment of the invention.

Such an embodiment will be presented below with reference to FIG. 2.

Figure 2:
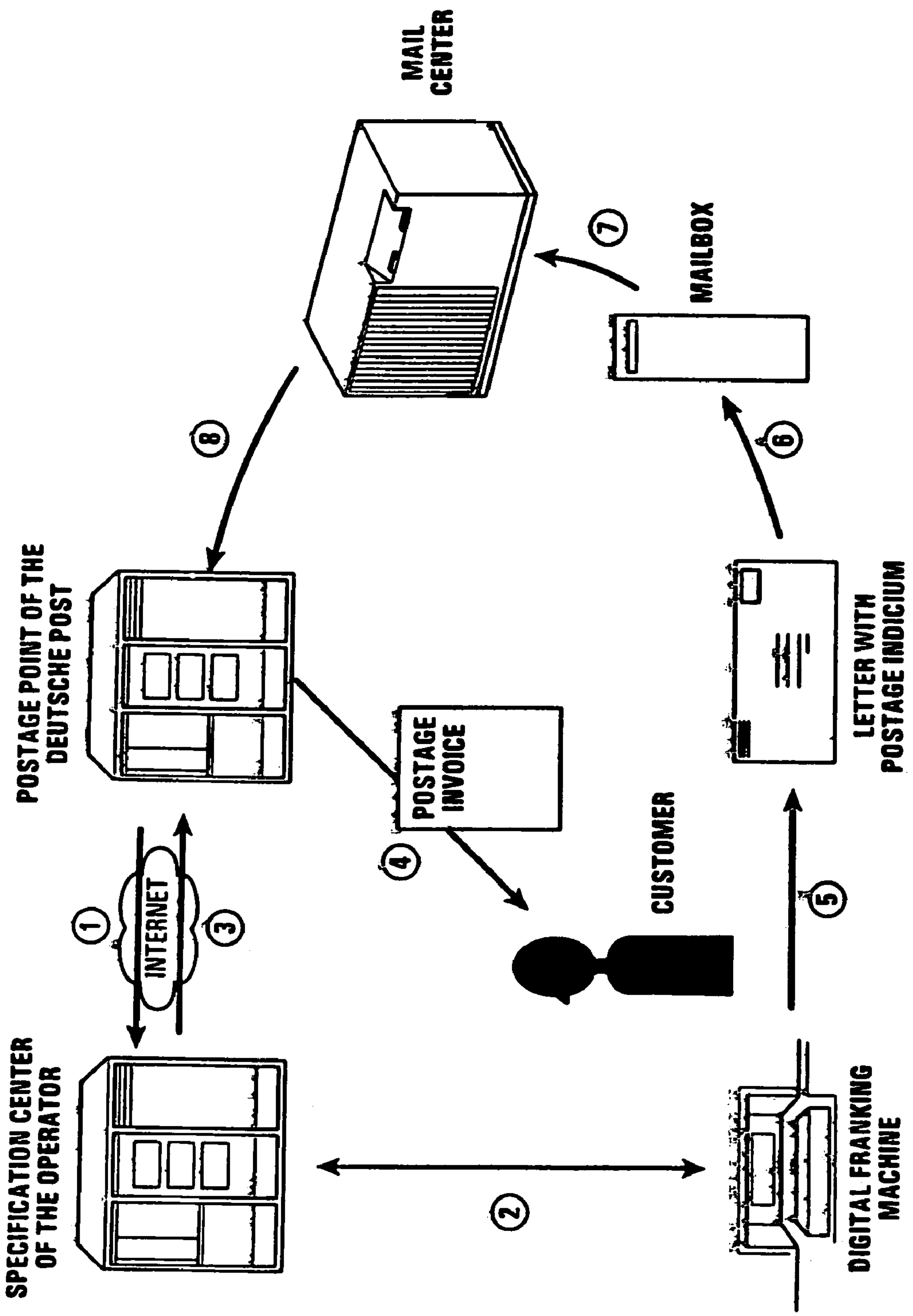
FIG. 2 a schematic diagram for a schematic representation of a generation according to the invention of digital postage indicia and FIG. 3 a schematic representation of especially preferred process steps for generating forgery-proof documents.

The schematic model or the function of the new digital postage indicia is depicted in FIG. 2 and described below:

1. Prior to the loading procedure between the specification center of the operator and the digital franking machine of the customer, the postal service provider electronically supplies the operator with machine-related information to be supplied to the digital franking machines in the future. This information includes, among other things, key information for use in the machine as well as a so-called "ValidityString" that is used for the later checking in the mail center as well as information on the credit status of the customer. Parts of this information are encrypted in such a way that they can only be decrypted within the franking machine.

2. Between the digital franking machine of the customer and the long-distance dialed specification center of the manufacturer, a specification loading procedure is carried out with the objective of increasing the available postage value in the franking machine. During this loading procedure, the machine-related information (previously provided by the Deutsche Post) is transmitted to a manipulation-proof area of the digital franking machine. Such a loading procedure in which the information (provided by the postal service provider) is transmitted to the machine, should be carried out regularly, within certain tolerances, for example, once within a predefinable time interval of, for example, once per month. If no new specifications are to be loaded, a communication procedure to this effect should be carried out once per month between the franking machine and the specification center during which the information provided by the postal service provider is transferred to the machine. The communication between the specification center and the digital franking machine has to be secured in an appropriate and verifiable manner.

3. Subsequent to the specification loading procedure (Step 1), a secure electronic communication pertaining to the purchase of a certain postage amount for a customer takes place between the specification center of the operator and the Postage Point of the postal service provider, which serves as the reliable contact station. In this data transmission, invoicing and usage information is transmitted to the postal service provider. Since, for the next loading procedure, the abovementioned provision of information can be carried out well ahead of time, it is possible—but not necessary—to combine Steps 3 and 1, so that Step 3 of the just-completed loading procedure coincides with Step 1 for the next loading procedure.

4. The postal service provider invoices the customer directly by automatic bank withdrawal for the postage amount purchased from the reliable contact station, the Postage Point of the postal service provider.

5. Fundamentally, the loaded digital franking machine can be used to print valid digital postage indicia until the credit balance is used up. The digital franking imprints contain a two-dimensional matrix code (2D-barcode) comprising additional data that, among other things, as described in Step 1, was given to the postal service provider ahead of time and that is used in the mail center to check the validity.

6. Mail pieces with digital franking imprints can be mailed via the modalities made available by the postal service provider such as, for example, mailboxes, post office branches.

7. Mail pieces bearing digital franking imprints are conveyed by the postal service provider after the validity has been checked.

8. In a comparison procedure, loaded postage values of the customer can be checked against the postage values read-in at the mail center.

Regarding the information that, as described in Step 1 above, is provided ahead of time by the Deutsche Post, there are two components that are of importance in the sense of the present invention, namely, first of all, the key information $m_{key}$ for use in the machine and secondly, so-called checking information VS. The Postage Point of the postal service provider that serves as the reliable communication partner encrypts the key information $m_{key}$ in such a way that a decryption is only possible in the manipulation-proof area of the digital franking machine (cryptographic module). The already encrypted checking information VS can be transmitted to the franking machine or to the cryptographic module without any further transportation encryption. The encryption of the key information $m_{key}$ means that a decryption is only possible in the cryptographic module of the franking machine, but not on the non-reliable communication route.

Figure 3:
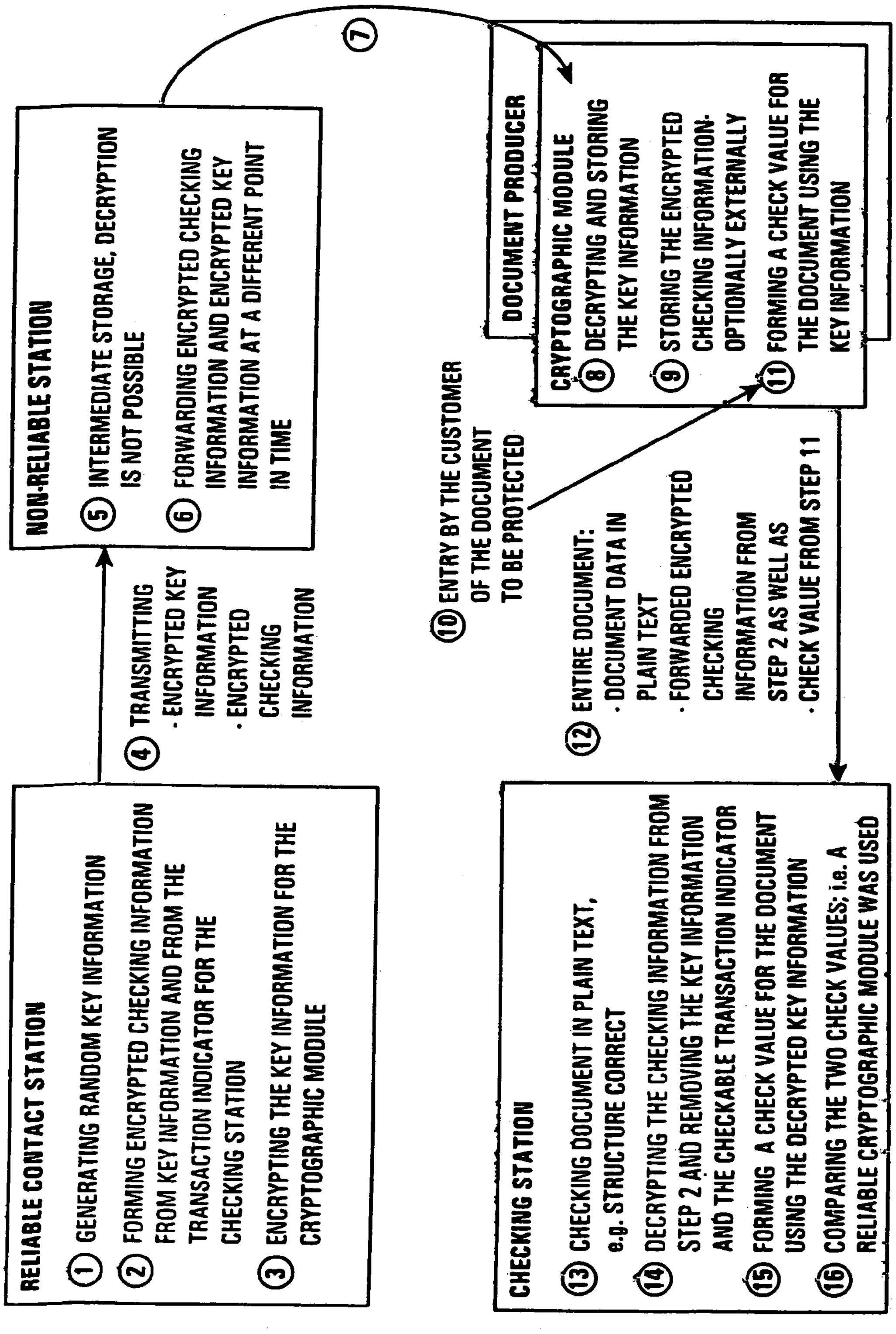

The principle of the security in generating forgery-proof documents with a cryptographic module that is supplied externally via a non-secure route is shown schematically in FIG. 3:

1. In a first step, key information is generated in a reliable contact station that, in actual practice, is embodied by the Postage Point of the postal service provider. This key information later serves to form a check value in the cryptographic module. In a practical manner, this key information later remains in the cryptographic module and it does not leave it.

2. In a second step, so-called checking information is generated. It is compiled from the key information from Step 1, from a transaction indicator containing additional information on the next loading procedure of the customer, as well as from other information. The compilation and subsequent encryption of these elements that make up the checking information are carried out in such a way that only the checking station is later capable of reversing this encryption. The compilation and subsequent encryption of these elements that make up the checking information are also carried out in such a way that, even if one has knowledge of the key information in plain text—which, however, is theoretically hardly possible outside of the reliable contact station and outside of the cryptographic module—it is not possible to discover the key for encrypting the checking information for the subsequent decryption at the checking station.

3. In a third step, the key information generated in the first step is encrypted in such a way that a decryption can only be carried out in the cryptographic module at the document producer, but not on the transmission route to it.

4. In a fourth step, the two types of information are transmitted, preferably together with other information that relates to the pending loading procedure of the customer and that further increases the manipulation security. On the one hand, this is the key information generated in Step 1 and encrypted in Step 3, which is later loaded into the cryptographic module, decrypted there and also remains there for the generation of forgery-proof documents. On the other hand, this is the encrypted checking information generated in Step 2 that can only be decrypted again by the checking station and that is attached to every document that is generated by the document producer later on.

5. In a fifth step, the two types of information that are relevant within the scope of this invention, together with other information on the pending loading procedure of the customer, are temporarily stored in the non-reliable station. A decryption of the two relevant types of information is not possible at this station. In particular, it is not possible to discover the key that was used in the reliable station to encrypt the checking information in such a way that only the checking station can decrypt it again for the very reason that the plain text of the key information that would be needed for such a so-called plain text attack is not present.

6. In a sixth step, the information provided by the reliable station is transferred to the cryptographic module at the document producer at a different point in time, for example, within the scope of the next loading procedure.

7. The seventh step relates to the communication between the non-reliable station and the cryptographic module, said communication preferably being secured by additional suitable means. After all, in actual practice, this is the communication between a specification center of a manufacturer and its franking machine with cryptographic module, information which has to be protected against manipulation precisely because of the loading amount that is being electronically exchanged. If this communication were not protected, then an unauthorized increase of the loading amount would be possible. Therefore, only in the sense of this invention is the specification center of the manufacturer considered to be a "non-reliable station," but in actual practice, it can certainly be classified as being reliable.

8. In an eighth step, the key information that was encrypted in Step 3 is decrypted and subsequently stored. This key information is used later to secure documents by generating a check value. In order to prevent the above-mentioned plain text attacks, it is important that the key information cannot be read out of the cryptographic module but rather that it can only be used within the module by the processes that are likewise present in the cryptographic module.

9. In a ninth step, the encrypted checking information from Step 2 is stored. Since this information is already encrypted and is no longer needed in the cryptographic module for data processing, it can be stored outside of the cryptographic module. The encrypted checking information is later attached to each secured document in order to be used in the checking station.

10. In a tenth step, preferably at a different point in time, the customer or document producer enters the contents of the document to be secured into the cryptographic module.

11. In an eleventh step, a check value is generated with the entered plain text information of the document using the still-stored key information from Step 1. The check value is generated employing a conventional check value method such as, for example, MAC (Message Authentication Code), HMAC (Hashed Message Authentication Code) symmetrical signature or the like. Several especially preferred embodiments have in common that fact that the plain text of the document is generally irreversibly abbreviated and simultaneously or subsequently encrypted with a key, in this case, the key information from Step 1.

12. In a twelfth step, the document is now transmitted. The entire document preferably consists of several, in particular three, components. A first component is the actual plain text information of the document. As the second component of the total document, the encrypted checking information from Step 2, which was stored in Step 9 in the cryptographic module or outside of the module, is attached to the document text and, from now on, attached to every document that is to be secured. As the third component of the entire document, the check value formed in Step 11 is attached.

13. In a thirteenth step, the document reaches the checking station where it is checked for its structural completeness and integrity. In the concrete application of the invention for checking postage indicia, additional congruence checks have to be carried out at this station. Since in this case, the secured document matches the machine-readable postage indicia, this can be checked against other mail piece information such as the address and the postage class as well as against general information such as the date. In this manner, it can be ruled out that an actually valid postage indicia is used to frank a mail piece that does not go with this postage indicia.

14. In a fourteenth step, the checking information encrypted in Step 2 is re-encrypted. The checking information comprising several components is broken down into its constituents once again. In addition to other information, in particular, the key information and the transaction indicator are obtained. The latter can serve for an additional checking procedure. Thus, for example, the identity of the customer or document producer, which has been deposited in the transaction indicator, can be compared to a positive list of acceptable document producers or to a negative list of unacceptable document producers deposited in the checking station.

15. In a fifteenth step, analogously to Step 11, a check value is generated. According to the same method as in Step 11, the plain text information of the document present in the checking station uses the just-decrypted key information from Step 14 to form a check value. If different methods are possible for generating check values in the crypto-graphic module, then the concrete choice of the method likewise has to be attached to the document or transferred to the checking station in the document of the document producer.

16. In the final step sixteen, the check value generated in the cryptographic module and attached to the document is compared to the check value generated in the checking station. Only if the two check values match is it ensured that the document was produced by the document producer using the cryptographic module.

A document producer who is acting fraudulently and wants to simulate a secure document of a customer, but who does not have access to the cryptographic module of the latter, will not be able to receive and decrypt the key information from Step 1. However, this key information is indispensable in order to create a check value that matches the check value generated in the checking station. On the other hand, if a document producer who is acting fraudulently invents suitable key information, which he can also use appropriately and correctly to form a check value, then he still will not succeed in creating matching encrypted checking information. This encrypted checking information would have to be encrypted in such a way that only the checking station is capable of carrying out a decryption. Without knowing the key that was employed, this is not possible. Consequently, the system is secure and cannot be breached.

Thanks to the invention, it is possible to generate forgery-proof documents and to reliably check the genuineness of the data contained in the document and/or the identity of the document producer.

All of the checking information needed for this purpose is preferably made available by the reliable contact station and/or the cryptographic module.

The invention is suitable for the generation of any documents. However, it is especially advantageous to use the invention for generating digital documents having a relatively small data volume in the order of magnitude of a few bits up to documents having a total size—including the checking information—of up to about 60 bytes.

Especially preferred documents in the sense of the invention are validity markings for numerous areas of application. It is especially advantageous to use the invention for checking digital postage indicia for mail pieces since it allows an especially fast and simple generation of the postage indicia. Its use in other areas as proof of payment of monetary sums—digital value markings—or as other carriers of monetary value information is likewise possible.

The invention is especially well-suited for all application cases in which, aside from the document producer, at least one checking authority has an interest in the genuineness of the document. Consequently, the invention is suitable for a wide range of applications, especially for generating digital value markings for a large number of areas of application such as, for example, airplane tickets, public transportation tickets, theater and movie tickets. The document producer can use the invention to print out such documents himself, whereby the document producer can utilize an existing balance—or amounts of credit—and can receive a reliable proof of payment in this manner.

These documents can be generated, for example, by a conventional personal computer or by a cryptographically non-secure printer. A special advantage of the invention is that the documents can be generated without direct connection between the document producer and the reliable contact station. Thus, document production is possible, also when intermediate stations are involved, or in the case of a communication via data routes that are difficult or impossible to secure cryptographically.

The cryptographically reliable contact station and/or the checking station contain means to ensure that no unauthorized documents have been produced, or that no documents have been forged. In this manner, it is especially simply and reliably possible to generate checkable reliable digital documents and to actually reliably check these documents.

Such a checking procedure can be carried out in various ways, whereby the above-mentioned cryptographic process steps can be applied simply and reliably. In this manner, the invention can also be used outside of the especially preferred realm of checking the authenticity of digital postage indicia of mail pieces, for example, to check the authenticity of digital public transportation tickets, airplane tickets, etc. by a checking authority, or by an access control.

The means described here and the process steps according to the invention can also be used for documents that are likewise encrypted before or during the generation of the forgery-proof documents in the sense of this invention. In this case, the method is preferably not used for an unencrypted plain text but rather for an encrypted text, whereby, however, the methods of this invention do not differ in this case. Depending on the modality, it would likewise be possible for the encryption to likewise take place in the cryptographic module and thus, as in the depiction in FIG. 3, an intermediate step of encryption would be performed between the Step 10 and Step 11 described here.

The invention claimed is:

1. A method for the generation of forgery-proof documents or data records, whereby key information is generated and whereby encrypted checking information is formed from the key information and from a transaction indicator, comprising;

generating key information in a contact station;

forming encrypted checking information from the key information and from the transaction indicator in the contact station, encrypting the key information in the contact station, transmitting the encrypted checking information and the encrypted key information to an intermediate station, storing the encrypted key information and the encrypted checking information in the intermediate station and subsequently transmitting the encrypted key information and the encrypted checking information to a cryptographic module at a different time from the transfer between the contact station and the intermediate station, decrypting the encrypted key information with a key contained in the cryptographic module, irreversibly linking document data to the key information, combining the document data and the key information that is irreversibly linked to the document data to form at least one of a document and a data record, and transmitting the document or data record to a checking station.

2. The method according to claim 1, comprising randomly generating the key information.

3. The method according to claim 1, comprising configuring at least one of the encrypted key information and the encrypted checking information in such a way that it cannot be decrypted in the intermediate station.

4. The method according to claim 1, comprising entering the document data into the cryptographic module.

5. The method according to claim 1, comprising irreversibly linking the document data and the key information by forming a check value from the key information.

6. The method according to claim 1, wherein the document or data record transmitted to the checking station is transmitted at least partially in plain text.

7. The method according to claim 1, comprising entering the encrypted checking information into the document or data record that is transmitted to the checking station.

8. The method according to claim 1, comprising encrypting information remaining in the cryptographic module in such a way that it can be decrypted in the cryptographic module.

9. The method according to claim 8, comprising supplying the cryptographic module with the information from a cryptographically reliable station that can be relied on by the checking station.

10. The method according to claim 9, comprising using cryptographic encryptions that the checking station can reverse.

11. The method according to claim 9, comprising supplying the cryptographic module via communication partners that are cryptographically non-reliable and forwarding information to the cryptographic module at a different point in time from the transfer of information between the contact station and the intermediate station.

12. The method according to claim 9, comprising supplying the cryptographic module via communication partners that are cryptographically not reliable in such a way that an exchange of information within a dialog is not necessary.

13. The method according to claim 1, comprising cryptographically linking the key information and the encrypted checking information to each other, such that said linking cannot be discovered by means of crypto-analysis.

14. The method according to claim 13, wherein the cryptographic linking of the key information and the encrypted checking information is such that non-linear fractions are added tat are known only to the reliable contact station and to the checking station.

15. The method according to claim 1, wherein the generated forgery-proof documents or data records contain monetary value information.

16. The method according to claim 15, comprising cryptographically connecting the monetary value information to the document or data record, and forming a check value by comparing the monetary value information to the document or data record.

17. The method according to claim 15, wherein the monetary value information contains proof of the payment of postage amounts.

18. The method according to claim 17, comprising linking the monetary value information to identification data.

19. The method according to claim 17, comprising linking the monetary value information to address data.

* * * * *